United States Patent

[11] 3,600,883

[72] Inventors: Lev Mikhailovich Piljugin, N121SNP, 14, Kv. 16, Moscow; Albina Demianovna Krivonosova, N121SNP, 9, Kv. 24, Moscow; Nikolai Petrovich Gavriljuk, Benderskaya. 30, Kv. 7, Kishinev; Jury Andreevich Utkov, N121SNP, 7, Kv. 6, Moscow, all of, U.S.S.R.
[21] Appl. No.: 804,413
[22] Filed: Mar. 5, 1969
[45] Patented: Aug. 24, 1971

[54] WORKING MEMBER FOR SHAKING OFF FRUITS TO BE USED IN FRUIT HARVESTERS
5 Claims, 4 Drawing Figs.

[52] U.S. Cl. .................................................. 56/330
[51] Int. Cl. ............................................. A01g 19/00
[50] Field of Search ............................................ 56/330, 328

[56] References Cited
UNITED STATES PATENTS
| | | | |
|---|---|---|---|
| 3,013,374 | 12/1961 | Balsbaugh .................. | 56/328 |
| 3,077,721 | 2/1963 | Balsbaugh .................. | 56/328 |
| 3,479,806 | 11/1969 | Pool et al. .................. | 56/328 |

Primary Examiner—Robert Peshock
Attorney—Waters, Roditi, Schwartz & Nissen

ABSTRACT: A working member for shaking off fruits for use in fruit harvesters including a flexible elastic V-shaped element connected at its base to a vibrator imparting oscillatory motion thereto, and the ends of the elastic element being immobile relative to the plane of oscillation of the elastic element.

PATENTED AUG 24 1971

WORKING MEMBER FOR SHAKING OFF FRUITS TO BE USED IN FRUIT HARVESTERS

The present invention relates to fruit harvesters and, more particularly, to working members for shaking off fruits used in such machines.

The present invention is most successfully used for shaking off berries, such as European black currant.

Known at present in the prior art are fruit harvesters wherein the working member is essentially a twin fork whose base is connected to the oscillating lever of the vibrator and end portions are made free.

The main disadvantage of the known harvester lies in the fact that the oscillating free end portions of the fork vibrates parts of a shrub being treated with a far greater amplitude than a preset one, which results in damage of the shrub parts, greater scattering of berries and, hence, worse conditions for their catching as well as an increased oscillation of the vibrator body, the latter fact affecting the work of the picker and, hence, decreasing his labor efficiency.

Also known in the prior art are fruit harvesters wherein the working member is made as a hook whose whole contour oscillates with one and the same amplitude.

This constructive embodiment of the working unit, though somewhat decreasing the damage of the shrub parts, does not eliminate it completely and, in addition, is disadvantageous in that it is rather difficult to introduce the hook into the branch.

It is an object of the present invention to provide a working member which would shake off fruits without damaging parts of the shrub.

Another object of the invention is to provide a working member for shaking off berries which would provide for a decreased scattering thereof.

Still another object of the invention is to provide a working member for shaking off fruits which would make it possible to improve the working conditions of the picker.

In the accomplishment of said and other objects of the invention, in a working member for shaking off fruits, comprising a fork and a vibrator imparting an oscillatory motion to the fork, in accordance with the invention, the fork is essentially a V-shaped flexible elastic element whose base envelops an axle secured on an oscillating lever of the vibrator, and whose end portions are connected to the vibrator body in such a manner that they are immobile in the plane of the V-shaped element oscillation. The working member made as a flexible element makes it possible to eliminate damage of parts of a shrub being treated and to decrease scattering of the berries and oscillation of the vibrator body.

It is expedient to make the flexible elastic element in said working member as a strap of polyurethane, which fact makes it possible to increase the area of the member contact with the branch of a shrub being treated and to provide for a better shaking off of the berries.

To increase its service life, the flexible elastic member may be made reinforced.

It is necessary to connect the end portions of the flexible elastic element to the vibrator body by means of brackets rigidly connected to the body.

This design of the working member, as compared to that of conventional working members, provides for a two to four time decrease in the berries scattering and the vibrator body oscillation.

The following description of an exemplary embodiment of the present invention is given with reference to the accompanying drawings, in which.

Figure 1:
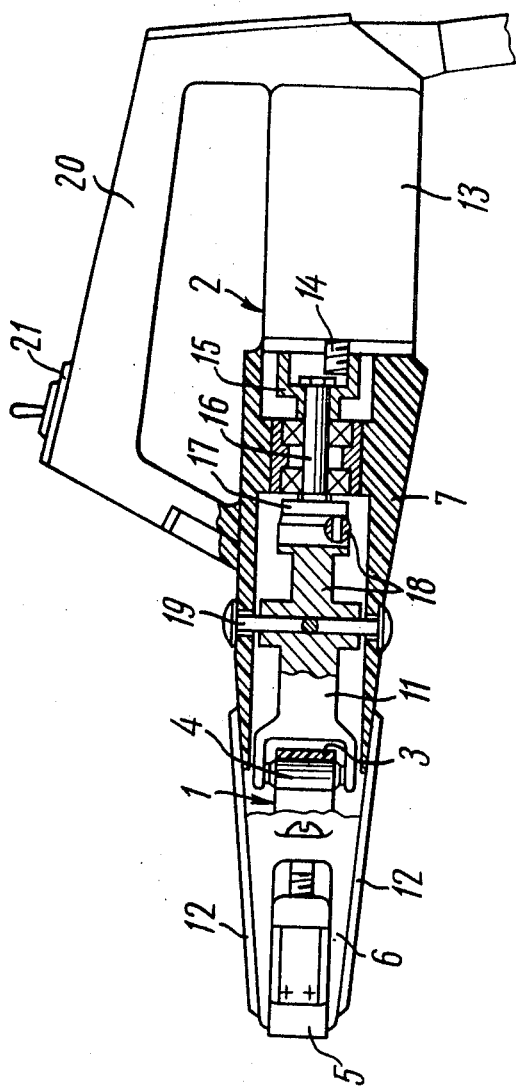
FIG. 1 shows a general view of a working member according to the invention, longitudinal section.

The working member for shaking off fruits comprises a fork fashioned as V-shaped flexible elastic element 1 (FIG. 1) and vibrator 2 imparting oscillation to the fork. Base 3 of the element 1 envelops axle 4 made as roller end portions 5 being secured by means of brackets 6 on body 7 of the vibrator 2. The element 1 is made as a strap of polyurethane or any other elastic material and may have a different cross section, for instance, a troughlike or elliptical one. To increase its strength at the point of contact with a branch being treated, the element 1 may be reinforced with bronze insert 8 (FIG. 3) which, however, may be made from any other material having a low friction coefficient.

With the brackets 6 made integral with the body 7 of the vibrator 2, the end portions 5 of the element 1 are immobile in the plane of the element oscillation (the oscillation of the element 1 is conventionally indicated by arrow B). The immobile end portions 5 of the element 1 are well observed when the fork is laid on a branch being treated.

One of the end portions of the element 1 is secured by means of stop plate 9 on the bracket 6, the other one being secured on a similar bracket by means of pressure device 10 providing for control over the degree of tensioning the element 1.

Figure 2:
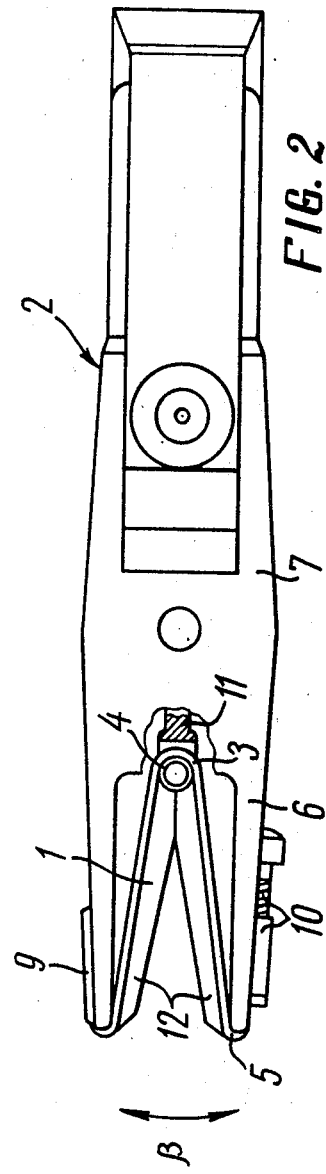
FIG. 2 shows a general view of a working member according to the invention, top view.
Figure 4:
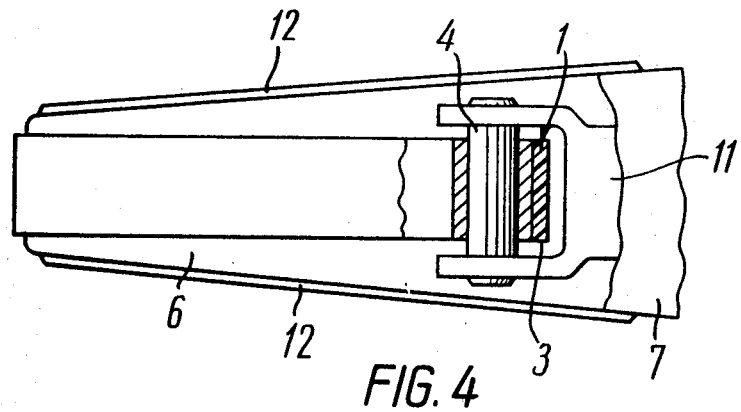
FIG. 4 is a view of FIG. 3 taken on arrow A.
Figure 3:
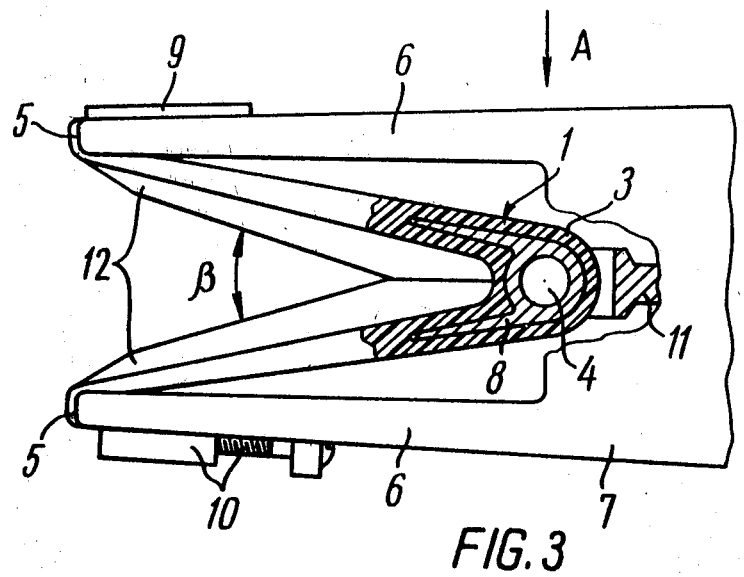
FIG. 3 shows the working member fashioned as a flexible elastic element.

The axle 4, made as a roller, is secured on swinging lever 11 (FIG. 1) capable of turning around its axis of rotation. This axle, however, may be secured in this lever immovably (as shown in FIGS. 2 and 3).

To prevent berries from getting into the zone between the brackets 6 and element 1, the brackets 6 are provided with casings 12 secured thereon and made from a soft elastic material precluding damage of the shrub parts.

The vibrator 2 comprises high frequency electric motor 13 (FIG. 1), the end portion of whose shaft is made as gear 14; gear 15 rigidly set on shaft 16; cam 17 secured on the other end portion of the shaft 16; and slide block mechanism 13 disposed on the lever 11.

The gears 14 and 15 are in internal meshing, the lever 11 swinging on axle 19.

A required amplitude of swinging of the lever 11 is achieved due to eccentricity of the cam 17 and an appropriate ratio chosen between the arms of the lever 11.

To hold it in hand, the working member is provided with handle 20 having switch button 21.

Fruits are shaken off by the working member in the following way.

The working member is set into operation by means of the button 21. The working member is laid by the picker onto a branch to be treated. The rotation of the rotor of the electric motor 13 causes rotation of the gear 14. The shaft 16 is imparted rotation by means of the mutually engaged gears 14 and 15. The number of revolutions of the shaft 16 provide for a frequency of the lever 11 oscillation equal to 36 c.p.s. The cam 17, rotating with the shaft 16, causes motion on the part of the slide block mechanism 18 which, in turn, makes the lever 11 oscillate about the axle 19. The axle 4 of the lever 11 oscillates with an amplitude of 15 mm.

The flexible elastic element 1 rolls by its base 3 over the axle 4, thus delivering impacts upon the branch. With the end portions 5 of the element 1 being immobile, they can be well observed when laid onto the branch. The amplitude of oscillation of the element 1 gradually increases in the direction from the end portions 5 to the base 3 and is a working one at the base. The picker lays the working member onto one and the same branch several times.

The impacts delivered by the flexible element upon the branch results in berries falling off into a catcher means (not shown in the drawing).

After all the berries have been dropped off a branch, the picker starts treating a new one.

What is claimed is:

1. A fruit-harvesting tool for shaking off fruits, comprising: a frame member having a clevis, a generally V-shaped flexible elastic fork element positioned within the clevis of said frame member; an axle encompassed by the base portion of said fork element, vibrator means mounted on said frame member; and a lever pivotally mounted in said frame member, said lever interconnecting said vibrator means and said axle for transmitting oscillating motion to the base portion of said fork element from said vibrator means, the tine ends of said fork element being rigidly fastened to said frame member whereby said tine ends are immobile relative to the plane of oscillation of the base portion of said fork element.

2. A harvesting tool as claimed in claim 1 wherein said elastic fork element comprises a polyurethane strap.

3. A harvesting tool as claimed in claim 1 wherein said elastic fork element is of a reinforced construction.

4. A harvesting tool as claimed in claim 2 wherein said elastic fork element is of a reinforced construction.

5. A harvesting tool as claimed in claim 1 including brackets rigidly connected to said frame member, the tine ends of said elastic fork element being fastened to said brackets.